July 22, 1958 W. C. GARNER ET AL 2,844,318
COUNTING DEVICE FOR CONVEYOR MECHANISMS
Filed Feb. 28, 1955 3 Sheets-Sheet 1

GUY BROOKSHIRE
WAYNE C. GARNER
INVENTOR.

BY *Cecil L. Wood*

ATTORNEY

July 22, 1958 W. C. GARNER ET AL 2,844,318
COUNTING DEVICE FOR CONVEYOR MECHANISMS
Filed Feb. 28, 1955 3 Sheets-Sheet 2
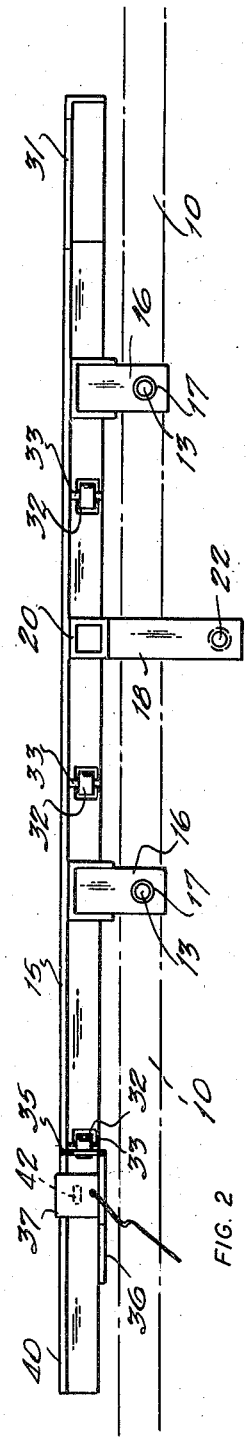
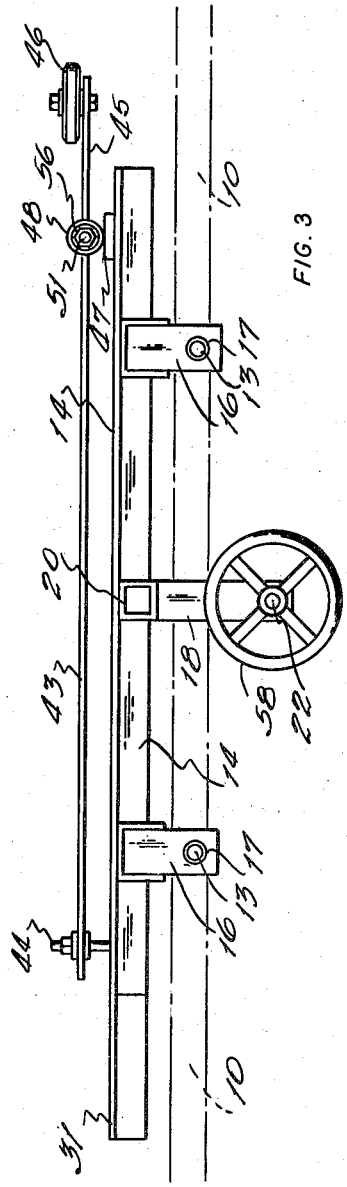
GUY BROOKSHIRE
WAYNE C. GARNER
INVENTOR.
BY
ATTORNEY July 22, 1958  W. C. GARNER ET AL  2,844,318
COUNTING DEVICE FOR CONVEYOR MECHANISMS
Filed Feb. 28, 1955  3 Sheets-Sheet 3

GUY BROOKSHIRE
WAYNE C. GARNER
  INVENTOR.

BY *Cecil L. Wood*

ATTORNEY

United States Patent Office 2,844,318
Patented July 22, 1958

2,844,318

COUNTING DEVICE FOR CONVEYOR MECHANISMS

Wayne C. Garner and Guy Brookshire, Fort Worth, Tex., assignors of one-third to V. W. Boswell, Fort Worth, Tex.

Application February 28, 1955, Serial No. 490,867

8 Claims. (Cl. 235—98)

This invention relates to industrial conveyor streams for conveying or transporting articles and merchandise from one department or location to another, such as in the packaging and shipping of boxes, crates, and the like, and it has particular reference to a counting mechanism adapted to be installed on any type of such conveyor device where different commodities are packed in rectangular containers, such as boxes, cartons, crates, and similarly formed containers, whereby such objects can be automatically counted in transit.

An object of the invention is that of providing a counting mechanism of simple design and construction which can be readily attached to conventional types of conveying apparatus, and providing adjustments therefor by which containers of different sizes can be properly counted as the same are carried along a confined path, the adjustments being easily accomplished, as desired, according to the size of the container.

The invention is designed for use where square or rectangular packages or crates are processed, such as are commonly used for packing canned goods, cereals, and other foods, or for crates containing milk, beverages, and the like, and by which the human agency can be obviated in metering or counting the units, resulting in greater accuracy and economy.

Broadly, the invention contemplates the provision of a case or crate counting device by which such articles can be automhatically metered while being transferred from loading or packing machines to storage or shipping, and without the necessity for manual effort.

While the foregoing objects are paramount, other and lesser objects will become manifest as the description proceeds, taken in connection with the appended drawings wherein:

Figure 2 is a side elevational view of one of the guide rails to which the counter device is attached.

Figure 3 illustrates, in elevation, the opposite guide rail, showing the adjusting wheel for the rails and the tensioned arm pivoted to the rail.

The invention does not contemplate the inclusion of any of the conveyor mechanisms, which are generally familiar to all industry engaged in packaging various kinds of merchandise in cartons, crates, and the like, but it does embrace a special arrangement by which such articles can be enumerated as they pass along a confined path.

Figure 1:
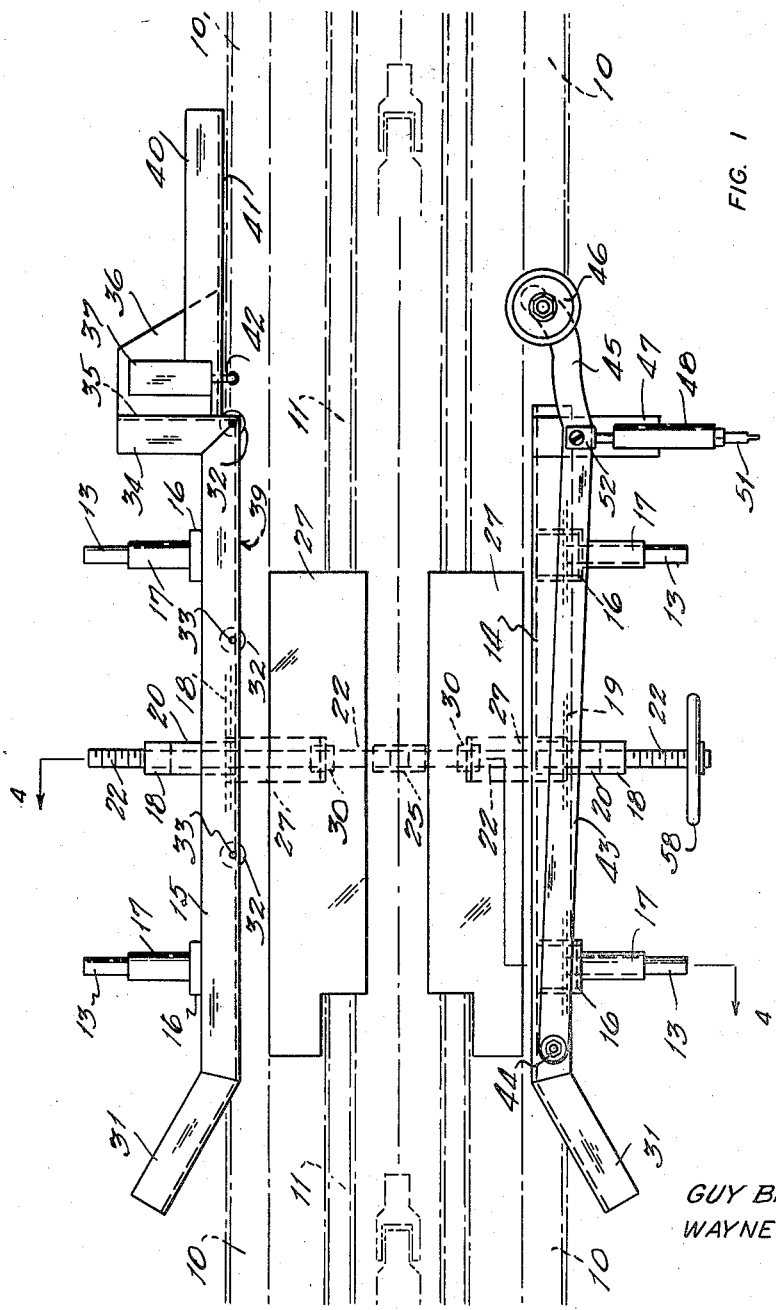
Figure 1 is a plan view of the invention shown applied to a conventional conveyor mechanism, the latter being shown in phantom.
Figure 7:
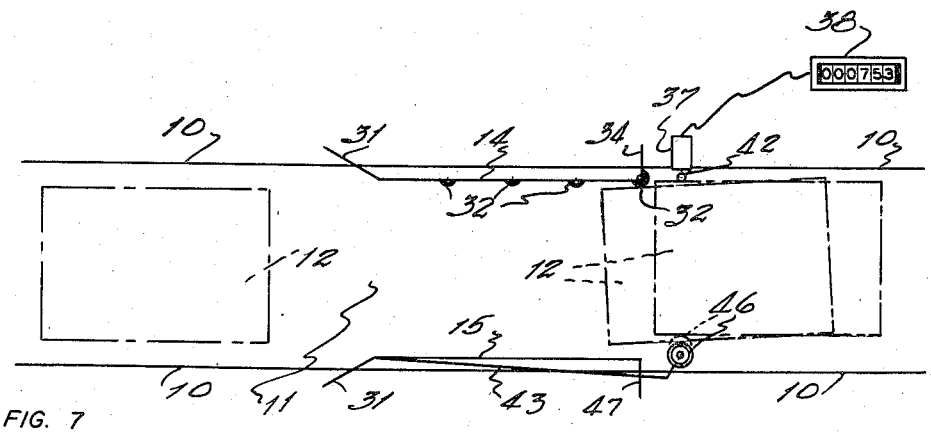

The invention comprises a unit which is adapted to be installed in a conventional conveyor system, shown in phantom lines in Figures 1, 2 and 3, and diagrammatically in Figure 7, and which consists generally of a pair of side frame members 10 supporting a continuous belt or chain conveyor 11, or a system of rollers as desired. The invention is specifically adapted for attachment to and use with a power driven conveyor designed to carry rectangular objects 12, such as boxes, crates, and the like, as indicated in broken lines in Figures 4 and 7.

Figure 4:
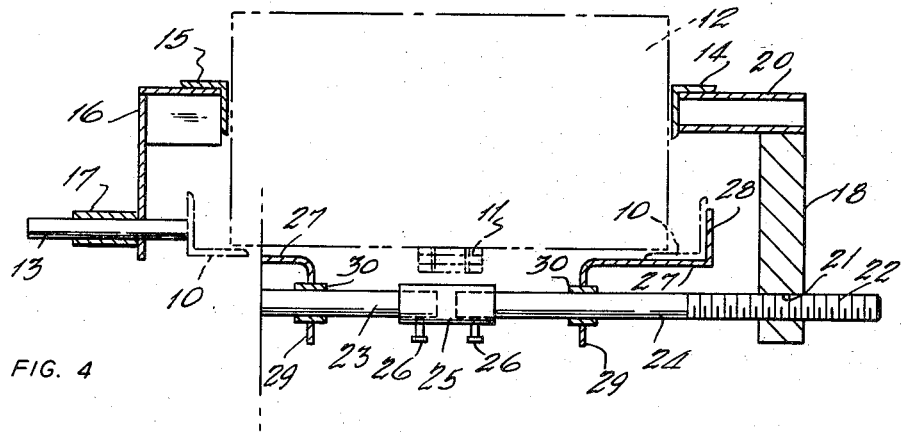
Figure 4 is a transverse sectional view of the invention, on lines 4—4 of Figure 1, showing the guide rails and fragmentarily illustrating the adjusting mechanism therefor.

The invention can be attached to the side frame members 10 of the conveyor at any desired point along their length, and these members are preferably angular, as shown in Figure 4. A pair of pins 13 is secured, as by welding to each side frame member 10 opposite each other, and each pair of pins 13 are spaced apart, as indicated in Figures 1, 2 and 3, and project outwardly or laterally from the frame members 10. Right- and left-hand guide rails 14 and 15 are supported on the pins 13 by brackets 16 whose upper ends are welded or riveted to the rails 14 and 15, as shown in Figures 2, 3 and 4, and each bracket 16 has a sleeve 17 welded to its lower end adapted to slidably embrace one of the pins 13 while retaining the brackets 16 in vertical positions thus rigidly supporting the guide rails 14 and 15 in parallel alignment.

Intermediate the brackets 16, on each side of the conveyor frame, are brackets 18 and 19 having shanks 20 whose inner ends are welded to the angular guide rails 14 and 15, as shown in detail in Figure 4. The lower ends of the brackets 18 and 19 have threaded bores 21 therein which receive the right- and left-hand threaded ends 22 of a pair of shafts 23 and 24 which are arranged in axial alignment across and beneath the conveyor frame and are rigidly connected by a coupler sleeve 25 secured to the inner ends of the shafts 23 and 24 by sets screws 26.

Supporting the shafts 23 and 24 are angular brackets 27 whose upper flanges 28 are welded to the angular frame members 10 of the conveyor, the lower flanges 29 having sleeves 30 welded therein to slidably support the shafts 23 and 24, in the manner shown in Figure 4. The brackets 27 are arranged beneath the frame members 10 and extend inwardly toward each other and afford guides for the shafts 23 and 24 which are rotated in the sleeves 30 and must move longitudinally, as will presently become manifest.

Each of the guide rails 14 and 15 have wings or angular portions 31 at their ends directed oppositely to that of the moving conveyor to provide means for guiding the conveyed articles 12 between the rails 14 and 15, as shown in Figure 1 and diagrammatically in Figure 7. To expedite movement along the guide rails 14 and 15 a plurality of rollers 32 are mounted in the rail 15 on vertical pivots 33.

At the discharge end of the left-hand rail 15 is a right-angular wing 34 to the vertical flange 35 of which is welded a horizontal plate 36 which supports an electrical micro-switch 37, or the like, having connection with a counter device 38, the latter being shown schematically in Figure 7. Spaced from the inner surface 39 of the rail 15 and welded to the depending flange 35 of the wing 34 is an extension 40 for the rail 15 providing an offset between the main inner surface 39 and the inner surface 41 of the extension 40 whereby the articles 12 can be moved laterally against the actuating plunger 42 of the switch 37, as indicated in Figure 7 in which the articles 12 are shown in broken lines in their positions before and after passing the offset at the end of the rail 15 where one of the rollers 32 is pivoted.

An arm 43 is arranged along and spaced above the right-hand rail 14 and is pivoted on a pin 44 projecting from the top of the rail 14 near the receiving end thereof, or near its angular wing 31, as illustrated in Figures 1 and 3. The arm 43 normally assumes a slight angular position with respect to the longitudinal axis of the rail 15, as shown in Figure 1, and has an angularly inclined portion 45 at its free end, and near the extremity thereof is pivoted a roller 46 which extends sufficiently into the path of the conveyed articles 12 to engage the same under yieldable tension. The roller 46 may, if desirable, be provided with a peripheral band of rubber, or other similar material.

Figures 5, 6:
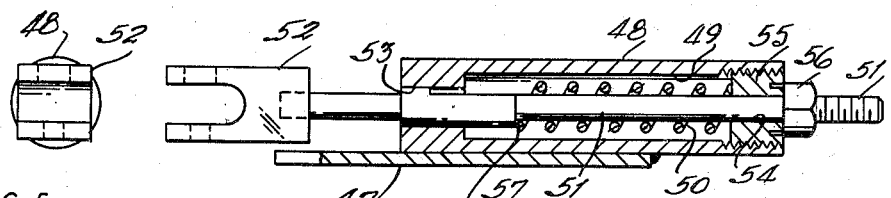
Figure 5 is and end view of the spring tensioning device for the pressure arm showing the clevis for attachment to the arm.
Figure 6 is a longitudinal sectional view of the cylinder for the tensioning device, showing the spring and adjustable plunger, and Figure 7 diagrammatically illustrates the conveyor, the counting mechanism and the counter, and showing the operation by rectangular articles shown in broken lines.

Connected by a plate 47 to the rail 14, as by welding, is a cylindrical barrel 48 having a chamber 49 therein in which a compression spring 50 is operatively arranged about a plunger 51 on whose outer end is provided a clevis 52, as shown in Figures 1, 5 and 6. The plunger 51 operates through bores 53 and 54 in the inner end of the barrel 48 and the plug 55 in the outer end thereof, respectively, the outer end of the plunger 51 being threaded to receive a nut 56 by which the tension on the spring 50 can be adjusted when required. The spring 50 bears against a shoulder 57 formed on the plunger 51, as shown in Figure 6.

The rails 14 and 15 are adjusted with respect to each other by rotating a wheel 58 on the outer end of the shaft 23, so that by the rotation of the wheel 58 both shafts 23 and 24, having right- and left-hand threads 22, will cause the rails 14 and 15 to move toward or away from each other to desired spacings in accordance with the dimensions of the articles 12 conveyed therebetween and caused to be counted.

In operation, the cartons or crates 12 carried along the conveyor 11 are guided between the guide rails 14 and 15 by the wings 31, and as the articles 12 move along the guide rails 14 and 15 each will engage the roller 46 on the arm 43, which has an adjusted yieldable tension imposed thereon by the spring 50, to urge the article 12 laterally toward the opposite rail 14 so that the trailing end of the article 12 will tend to suddenly move against the plunger 42 of the micro-switch to actuate the counter 38, in the manner illustrated in Figure 7.

Manifestly, the structure herein shown and described is capable of certain changes and modifications from time to time, by persons skilled in the art, without departing from the spirit and intent of the invention or the scope of the appended claims.

What is claimed is:

1. In a conveying and counting mechanism for packaged commodities, in combination with a moving conveyor having a driving unit, a counting mechanism comprising a pair of rigid rails aligned with a section of said conveyor and adjustable with respect to each other transversely of said conveyor, an angular guide on each of said rails directed oppositely from the movement of said conveyor, one of said rails having a right angular portion opposite its guide member defining an offset in the conveyor, an arm pivoted at one end to the opposing rail near the guide thereon and extending along said rail in the direction of movement of said conveyor and inclined inwardly at its free end, a roller on the free end of said arm, a spring tensioning said arm inwardly and having an adjustment, and a counting device arranged opposite said arm at the end of the opposing rail engageable by a package contacting said roller.

2. In a counter mechanism for a conveyor system for packaged commodities, in combination with a moving conveyor having a confined path, a restriction in the said path comprising a rail on each side of said conveyor capable of being adjusted with respect to each other and with respect to the width of articles conveyed therebetween, a right angular wing on one of said rails defining an offset at the end of said restriction, an arm pivoted at one end on one of said rails and having a roller pivoted at its free end, means connected to one side of said conveyor providing an adjustable spring tension on said free end of said arm against an article moved between said rails and in contact with said roller and into said offset, and a counter arranged opposite said roller near said offset adapted to be actuated by contact of said article when said roller moves said article thereagainst.

3. In a counter mechanism for packaged commodities, in combination with a moving conveyor for such packages having a confined path, an adjustable restriction in said path comprising a pair of rails having means for adjustably spacing the same with respect to the width of articles conveyed along said path, one of said rails having a right-angular wing defining an offset in said path at an end of said restriction, an arm pivoted at one end to one of said rails near the approach to said restriction and having a roller pivoted at its free end, means exerting a yieldable tension to the free end of said arm whereby to engage said roller with an article as the same moves along said conveyor and urging said article laterally into said offset in said restriction, and a counter device opposite said roller adapted to be actuated by said article when said roller is engaged thereby.

4. In a counting device for packaged articles moved along a conveyor mechanism, in combination with the said conveyor, a restriction in said conveyor comprising a rail rigidly attached to each side thereof and capable of adjustment with respect to each other, one of said rails ending to define an offset in said conveyor, an arm pivotally secured at one end to the opposite rail and having a roller pivoted at its free end extending into the path of said conveyor, adjustable means yieldably tensioning said arm against the pressure of an article moving along said conveyor to move the same into said offset, and a counter arranged near said offset opposite said roller capable of being actuated by pressure of said roller against an article moved between said rails by said conveyor.

5. In a counting mechanism for packaged commodities adapted for use with a continuous conveyor system having a confined path, in combination with said system, a restriction therein comprising a pair of rigid rails embracing the path of articles conveyed along said system and adapted to be adjusted with respect to each other and with respect to articles conveyed therebetween, an arm pivotally attached at one end to one of said rails and extending in the direction of travel of said conveyor, a roller freely pivoted at the free end of said arm engageable with articles moved along said conveyor between said rails, adjustable means imposing a yieldable tension on said arm and said roller, and a counting device arranged opposite said roller adapted to be actuated by an article on said conveyor engaged by said roller and moved laterally thereagainst.

6. A device for counting packaged commodities conveyed along a confined path, in combination with a conveyor mechanism, a restriction in said conveyor mechanism comprising a rail rigidly arranged at each side thereof at a point along its path and capable of adjustment with respect to each other, an arm pivoted at one end to one of said rails and having a roller pivoted at its free end, means for exerting an adjustable tension on said arm at its free end to engage said roller with objects moved along said conveyor between said rails, and a counter arranged opposite said roller capable of actuation by objects engaged and moved laterally by said arm and said roller as the same are moved along said conveyor.

7. In a counter device for crates and boxes, in combination with a conveyor therefor operating in a confined path, a restriction in said path comprising a pair of rigid rails embracing said path and adjustable with respect to each other, a counter mechanism at one side of said conveyor at one end of one of said rails, an arm arranged on the opposite rail and pivoted at one end thereto, a roller on the free end of said arm engageable by crates and boxes moved along said conveyor, and adjustable spring-tensioned means urging the free end of said arm toward said conveyor whereby to move said crates and boxes thereon laterally toward said counter mechanism sufficient to engage and actuate it.

8. In a counting mechanism for packaged articles moved along a conveyor, in combination with a moving conveyor device operating in a confined path, a guide rail rigidly arranged on each side of said conveyor at a point along its length, means for adjusting the spacing of said guide rails relative to articles moved along said conveyor therebetween, a counter device on one side of said conveyor at one end of one of said rails, a pressure arm pivoted at one end to the opposite rail and having a roller on its free end, opposite the counter, and adjustable spring-tensioned means urging the free end of said arm toward said conveyor.

References Cited in the file of this patent
UNITED STATES PATENTS

| | | |
|---|---|---|
| 1,054,814 | Barienger | Mar. 4, 1913 |
| 1,250,483 | Moore et al. | Dec. 18, 1917 |
| 1,855,767 | Neuman | Apr. 26, 1932 |
| 1,963,791 | Keller | June 19, 1934 |
| 1,967,732 | Ahlburg | July 24, 1934 |

FOREIGN PATENTS

| | | |
|---|---|---|
| 367,293 | Great Britain | Feb. 18, 1932 |

OTHER REFERENCES

Section 1044, on page 262 of "Mechanical Movements," by Hiscox; published in 1899 by Norman W. Henley & Co. 132 Nassau Street, New York, N. Y.